June 22, 1937.  W. H. JONES  2,084,346
WATER FILTER SYSTEM
Filed Nov. 14, 1934  4 Sheets-Sheet 1

INVENTOR
Willis H. Jones
BY
ATTORNEYS

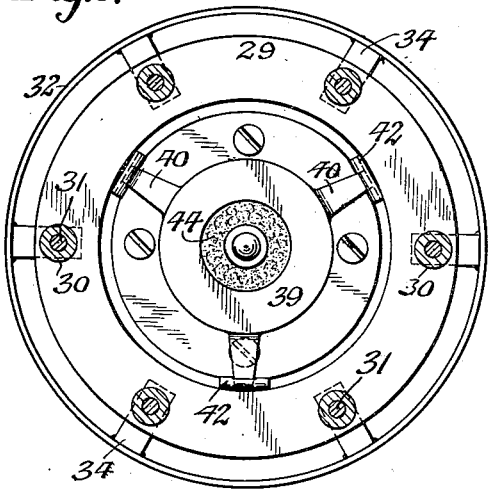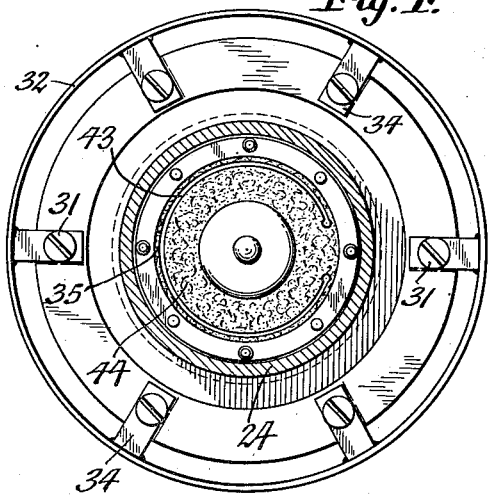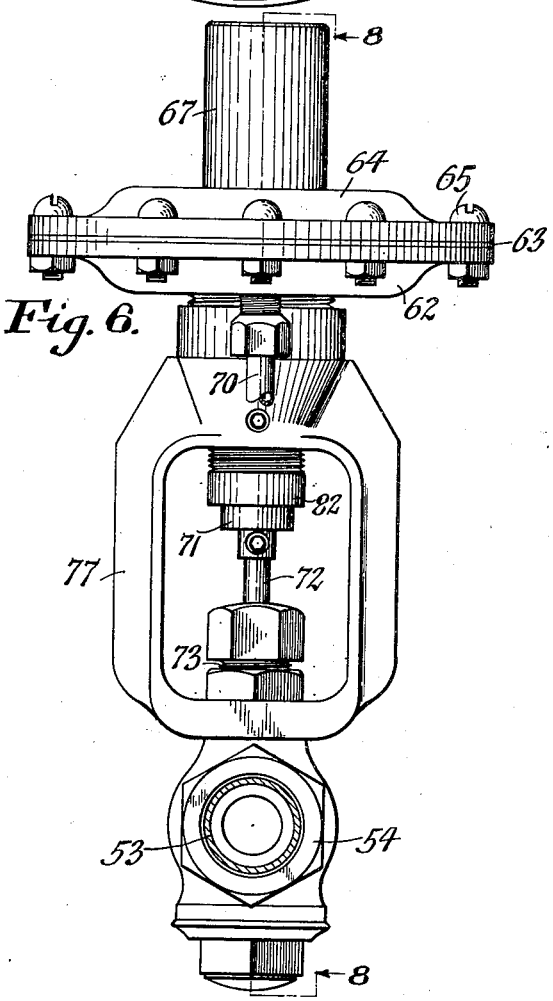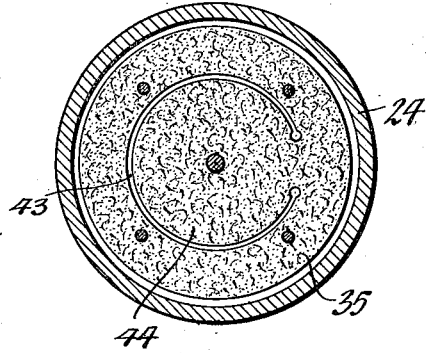

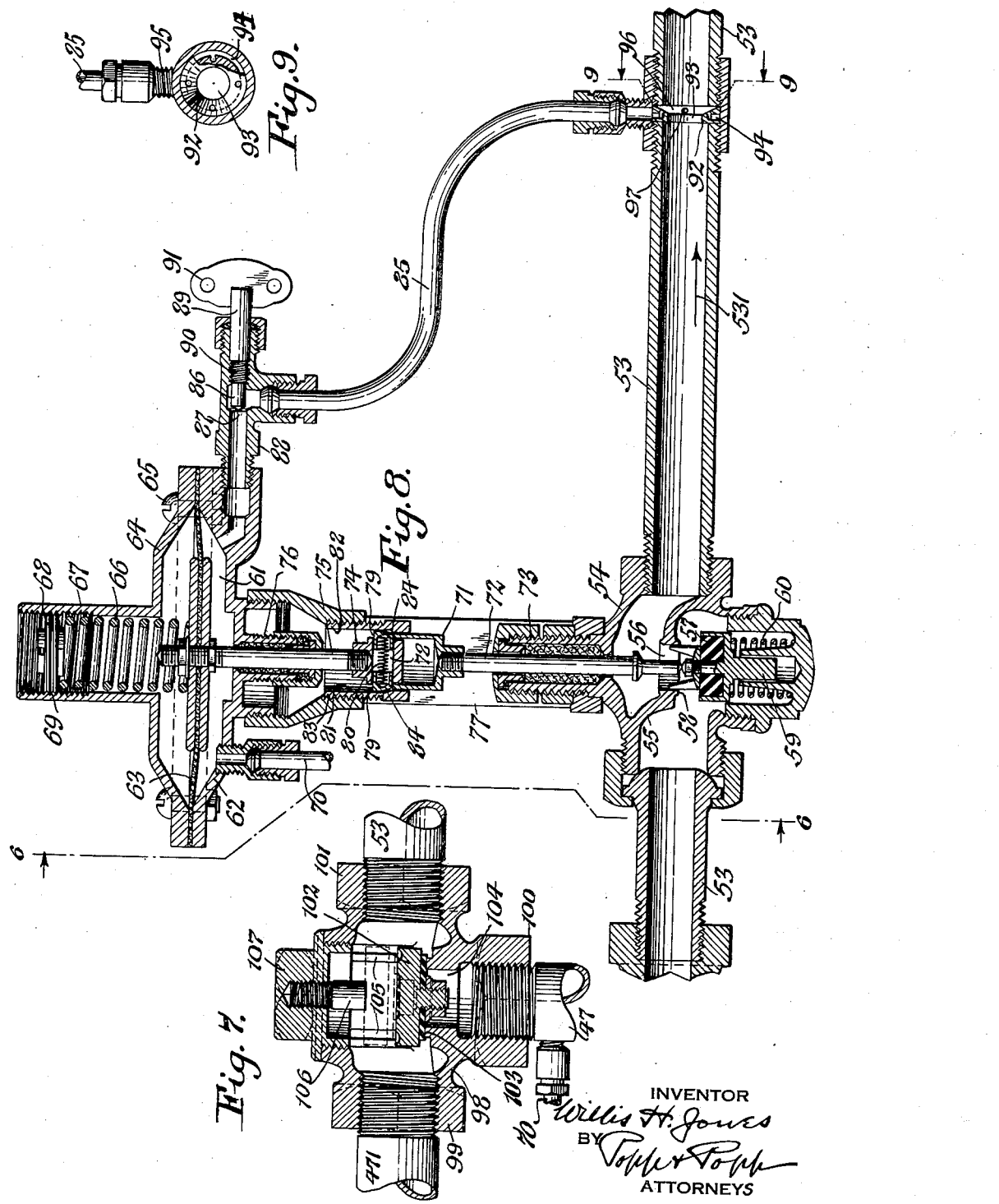

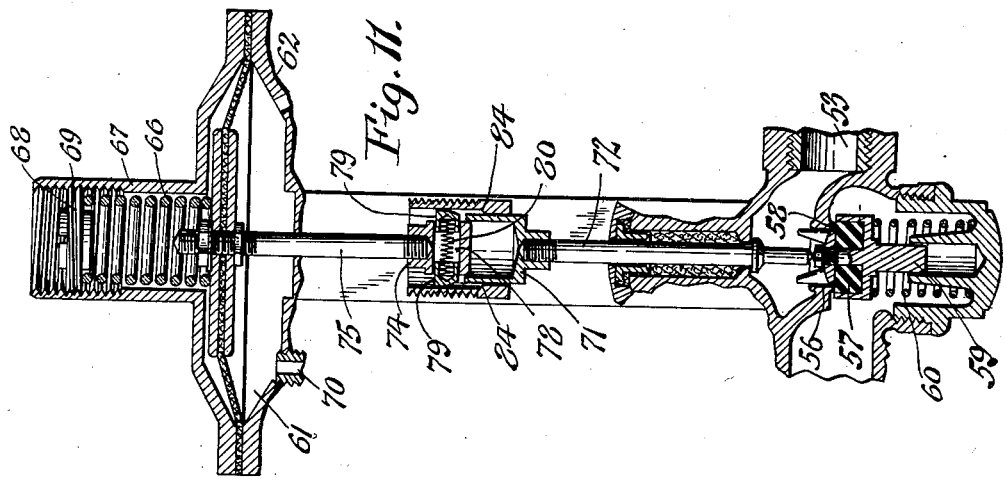
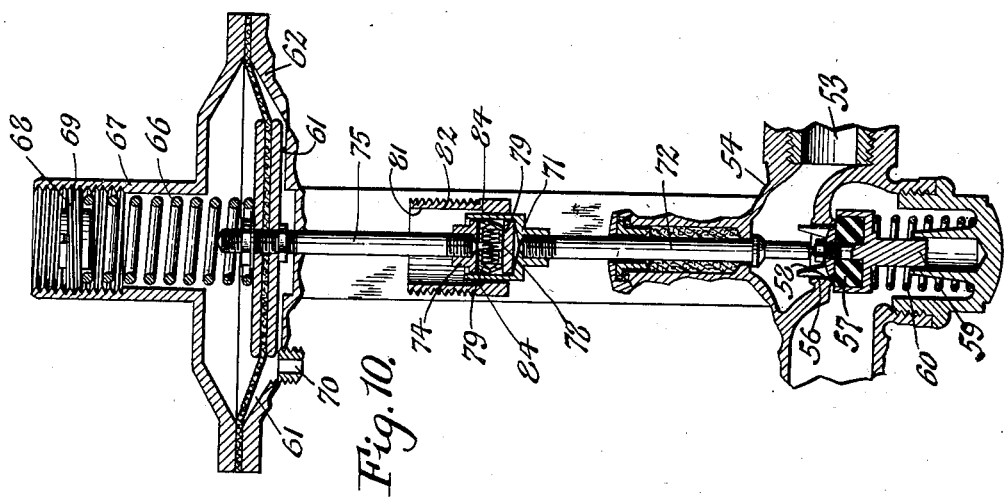

Patented June 22, 1937

2,084,346

UNITED STATES PATENT OFFICE 2,084,346

WATER FILTER SYSTEM

Willis H. Jones, Kenmore, N. Y.

Application November 14, 1934, Serial No. 753,008

17 Claims. (Cl. 210—98)

This invention relates to a filtering system, and more particularly to mechanism whereby a back-wash or flow of water is periodically produced through the filter system for the purpose of agitating the granular body through which the water has been filtered and thereby eliminate from this granular body such particles or materials which have been separated from the water during the filtering operation and clean this filtering material so that the same can be re-used and the filter restored to its most effective filtering capacity.

Although this flushing device may be used in connection with various types of filtering bodies, it is preferably combined with a filtering apparatus of the general type shown in application for U. S. Patent Ser. No. 699,151 filed November 22, 1933, to which reference may be had for detailed information.

It is the object of this invention to provide means for flushing the filter proper of a filtering system by means which operate automatically and are responsive to the rise and fall of the pressure on the outlet side of the pump which transfers the water from the filter to a pressure tank, which means are so organized that they are positive and reliable in operation, comparatively simple in construction, and not liable to get out of order, so that inspection, adjustment and repairs of the same may not be necessary excepting at infrequent intervals.

In the accompanying drawings:

Figures 3, 4 and 5 are horizontal sections, taken on the correspondingly numbered lines in Fig. 2.

Figure 6 is a transverse sectional elevation of a part of the automatic flushing device taken on line 6—6 Fig. 8.

Figure 7 is a vertical longitudinal section of the automatic check valve whereby the outlet of the pump is connected with a pressure tank while the pump is in operation, but operates to cut off the pump from the pressure tank when the pump ceases to operate.

Figure 8 is a vertical longitudinal section of the flushing device taken on line 8—8 Fig. 6.

Figure 9 is a vertical transverse section taken on line 9—9 Fig. 8.

Figures 10 and 11 are vertical fragmentary longitudinal sections of the flushing device similar to part of Fig. 8 but showing the parts in different positions.

In the following description similar characters of reference indicate like parts in the several figures of the drawings.

In its general organization this filtering system comprises a filter whereby solid impurities are separated from the water, a pump which draws the water through said filter, a pressure tank which receives the filtered water from the pump and from which the water is delivered to the place of consumption, automatic means for starting the pump when the pressure on the discharge side of the pump drops below a predetermined point and automatically stops the pump when the pressure reaches a predetermined point, and a flushing device which automatically operates to produce a back-wash or return flow of water from the pressure tank and through the filter whenever the pump ceases to operate, and thereby agitate and cleanse the filter by removing solid impurities therefrom and thus maintain the filter in good working condition.

The particular filter which is shown in Figs. 1–5 of the drawings is merely an example of one suitable for use in connection with this filtering system, and as there shown, is constructed as follows:

The numeral 20 represents a filtering chamber which contains a body 21 of granular filtering material such as sand, gravel or the like, so that when a stream of water is drawn through this body of filtering material while the latter is at rest, any solid impurities will be removed from the water and retained on one side of the body of filtering material. In the preferred construction the raw water is admitted into the filter chamber through an opening 22 in the top thereof so that the separated material is deposited on top of the filtering body 21 and the purified water is withdrawn from the lower end of this chamber.

Figure 1:
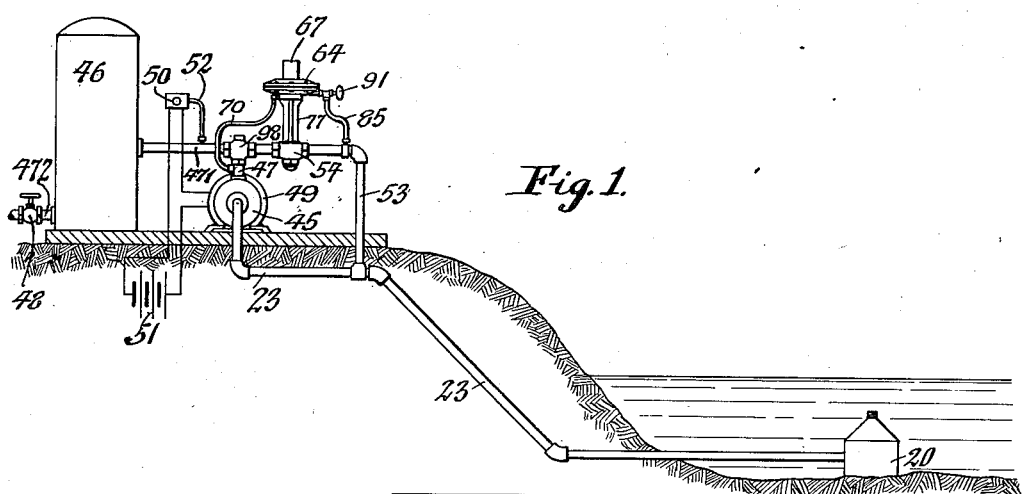
Figure 1 is a vertical longitudinal sectional elevation showing a water pumping installation embodying a satisfactory form of my invention.

The water may be supplied to this filtering chamber from any suitable source, either by connecting a supply pipe with the inlet 22 or by actually submerging the chamber 20 in a body of water, as shown in Fig. 1, in which latter the filter chamber is represented as resting on the bottom or floor of the lake, river, stream, creek or pond which furnishes the raw water to be filtered to the inlet 22 of the filter chamber, which latter is arranged below the level of the water.

The filtered water is withdrawn from the filtering chamber through an outlet pipe 23. Between this outlet pipe and the lower end of the filtering chamber is arranged a check valve device which permits only a restricted flow of water from the filter to the outlet pipe 23 during the normal filtering operation, but provides a passage of larger capacity from the outlet pipe 23 to the filter chamber when a backward flow through the same is effected for agitating the granular filter body and washing out any impurities therefrom and discharging such impurities through the inlet 22 to the source of water supply, such as the space in the body of water in which the filter is submerged.

This check valve device, as shown in Figs. 2–5, is preferably constructed as follows:

The numeral 24 represents the body of the filter check valve which contains a valve chamber 25 having its upper end connected with the outlet pipe 23, while its lower end is covered by a screen 26 and its intermediate part is provided with an inner downwardly facing valve seat 27. The lower end of the valve chamber is separated from the bottom 28 of the filter chamber and supported in this position by resting flanges 29 on the lower end of the valve chamber on posts 30 rising from the bottom of the filter chamber, said flanges and posts being connected by means of screws 31. Surrounding the lower part of the valve chamber is a baffle ring or member 32 which is separated at its lower edge from the bottom 28 of the filter chamber so as to form an intervening annular passage 33 therebetween, said baffle ring being supported in this position by means of lugs 34 projecting inwardly from this baffle and secured to the upper side of the flange 29 by means of the screws 31.

Figure 2:
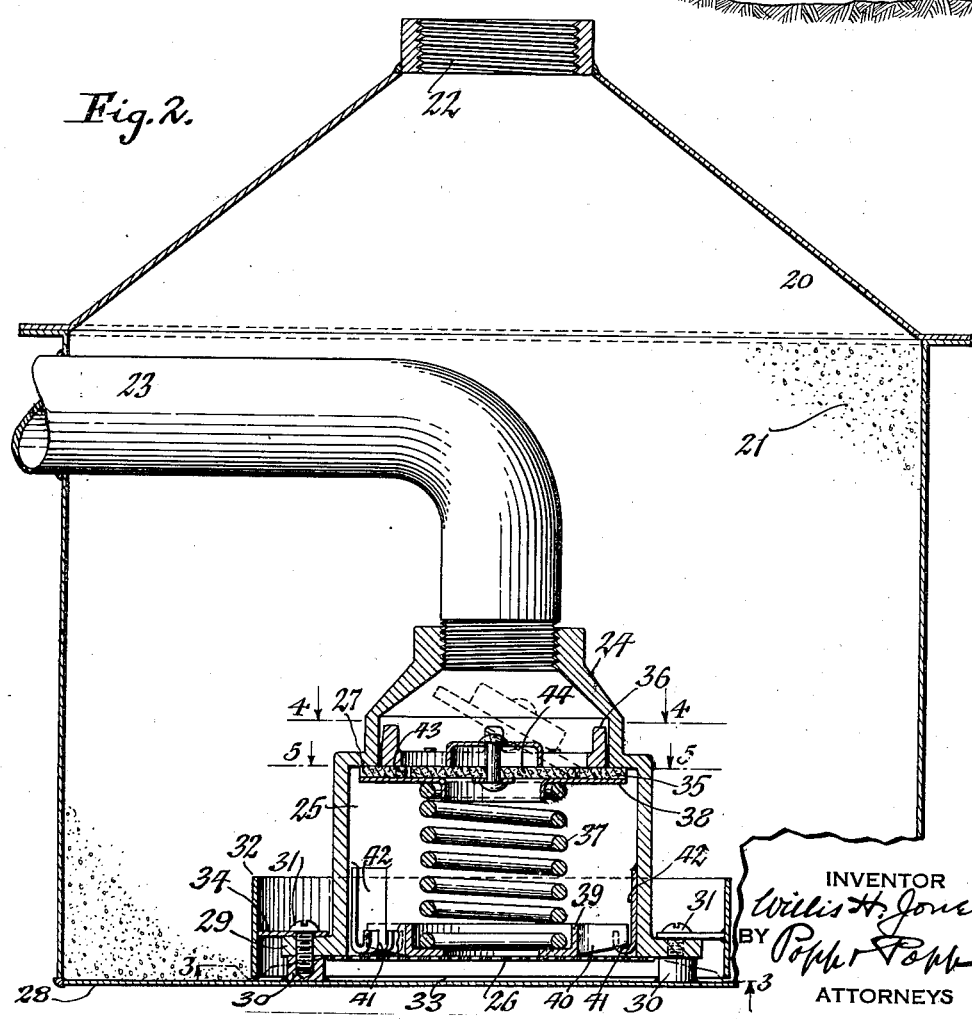
Figure 2 is a vertical section, on an enlarged scale, of one form of filter suitable for use in connection with this flushing device.

The numeral 35 represents an outer ring-shaped check valve which is arranged in the lower part of the valve chamber 25 and is movable toward and from the valve seat 27, said check valve being guided relatively to this valve seat and held in its operative position by a plurality of guide arms 36 projecting upwardly from the ring which is secured to the upper side of the valve 35 and adapted to engage with the inner side of the upper part of the valve chamber, as shown in Fig. 2. This valve is yieldably held in its elevated closed position against the valve seat 27 by means of a spring 37 arranged in the lower part of the valve chamber 25 and engaging its upper end with a bearing ring 38 secured to the underside of the valve 35, while the lower end of this spring rests in a cup-shaped seat 39 of a spring support. The latter is detachably mounted within the lower part of the valve chamber by a plurality of supporting arms 40 projecting laterally from the seat 39 and resting at their outer ends in notches 41 formed on brackets 42 mounted on the inner side of the lower part of the valve body 24. This seat 39 and its supporting arms 40 may be mounted on the valve body 24 by passing this spring support into the valve body while the supporting arms 40 are out of line with the brackets 42, then turning the spring support so that the arms are above the notches 41, and then lowering the support so that these arms engage with the notches, after which the support is held against downward as well as rotary movement within the valve body.

In its center the ring valve 35 is provided with a port 43 which is adapted to be opened and closed by a vertically movable clack valve 44 which is connected at one part of its edge with the ring valve 35 and which, while in its normal horizontal position, is flush with the ring valve and rests on the upper side of the disk 38 for closing the port 43, as shown by full lines in Fig. 2, but may assume an upwardly inclined position, as shown by dotted lines in the same figure for opening this port.

During the normal flow of water for filtering the same it enters the inlet 22 of the filtering chamber, thence downwardly through the body of granular filtering medium 21 to the bottom of this chamber, thence inwardly underneath the baffle ring 32 and the lower end of the valve body 24, thence upwardly through the screen 26 and valve chamber 25, and then is discharged through the delivery pipe 23, during which time the pressure of the water lifts the clack check valve 44 so as to permit the passage of water through the port 43 and cause the impurities in the water to be separated from the water and deposited on the upper side of the bed of filter material 21.

Upon forcing filtered water backwardly through the delivery pipe 23 the pressure of this water against the upper side of the central clack valve 44 and the outer ring valve 35 causes both of these valves to be depressed so that the ring valve is depressed out of engagement from the valve seat 27, whereby the water is permitted to flow downwardly through the valve chamber 25, thence through the screen 26, thence laterally outward underneath the lower edges of the valve body and the baffle 32, thence upwardly through the inner annular space between the baffle and the valve body and the outer annular space between the baffle and the upright wall of the filtering chamber to the top of the filter chamber, and then escapes from the upper inlet opening 22 of the latter to the surrounding body of water, during which movement of the water in the filtering chamber the same agitates or stirs up the granular filtering medium and washes out any impurities deposited thereon or mixed therewith, and carries the dirt out of the filter chamber into the surrounding body of water where the same is precipitated, thereby cleansing the granular body within the filter and restoring its cleansing capacity.

Any suitable pump may be employed on shore or elsewhere for drawing the water forwardly through the filter, that, for example, shown in the drawings consisting of a rotary pump 45 which has its inlet connected with the delivery end of the pipe 23 of the filter. On shore or other suitable place a pressure tank 46 is provided which is connected by the sections 47, 471 of a conduit with the outlet of the pump 45 and which is closed at the top so that the feeding of water into this tank will cause the air in the top or dome of the same to be compressed and thus serve to forcibly discharge the water from the tank upon releasing the water contained therein. The delivery of water from this tank to the place of consumption may be effected in any suitable manner, for example—by means of a delivery pipe 472 communicating with the lower end of the tank and provided with a valve 48 for regulating such discharge or cutting the same off altogether.

In the preferred construction an electric motor 49 is employed for driving the pump 45, and control means are associated with this motor whereby the same and the operation of the pump are automatically stopped when the pressure in the tank 46 rises above a predetermined point, and this motor and the operation of the pump are again restarted automatically when the pressure in the tank 46 falls below a predetermined point. Any suitable means may be provided for this purpose and it is therefore deemed sufficient for present purposes to show a conventional electric switch 50 which is responsive to variations in the pressure of the water on the outlet side of the pump, and is operatively connected with the motor 49 and with an electric source or battery indicated at 51 in Fig. 1.

This pressure controlled electric switch is preferably connected by means of a pipe 52 with the section 471 of the piping, whereby water is delivered from the outlet of the pump to the pressure chamber 46, as shown in Fig. 1. When the pressure in the tank 46 is below normal the pressure controlled switch 50 closes the circuit through the battery 51 and motor 49, thereby causing the latter to run and operate the pump 45 so that water is drawn through the filter and discharged into the tank. When the latter has been again refilled so as to restore the predetermined pressure, then the switch 50 is again opened so as to break the circuit which includes the electric source 51 and the motor 49, whereby the latter is stopped and the pumping of water from the filter to the tank is arrested.

The means whereby a back-wash or return flow of water from the tank or outlet side of the pump to the filter is effected periodically for the purpose of automatically cleaning or washing the impurities out of the granular filtering material in accordance with my invention, are constructed as follows:

The numeral 53 represents a back-wash or flushing conduit preferably made of suitable piping which connects at its opposite ends with the outlet and inlet sides of the pump, this being preferably accomplished by connecting this conduit at one end with the sections 47, 471 of the pipe between the pump and the tank 46, and the opposite end of this back-wash conduit is connected with the pipe 23 leading from the filter to the inlet of the pump, as shown in Fig. 1.

In the back-wash or flushing conduit is arranged a flushing valve which is adapted to be opened intermittently for permitting filtered water to pass from the pressure tank back to the filter so as to produce a return flow in the latter and wash the granular material therein. This flushing valve, in its preferred construction as best shown in Figs. 6, 8, 10 and 11, comprises a body 54 which has its opposite ends connected with sections of the conduit 53 so as to form a part thereof, and provided with a partition 55 having a port 56 therein and a valve closure 57 which is movable toward and from a seat 58 around the port 56 so as to cover and uncover the latter, and a carrier 59 for said closure which is guided on an adjacent part of the valve body and is yieldably moved by a spring 60 in the direction for engaging the closure 57 with the seat 58 and closing the port 56.

The numeral 61 represents a control chamber, one wall 62 of which is preferably constructed of rigid material and another wall 63 of which is preferably constructed of flexible material so that this last-mentioned wall is capable of movement toward and from the rigid wall for expanding and contracting this chamber.

The movable wall 63 is preferably constructed in the form of a diaphragm which is arranged above the rigid wall 62 and assembled with the latter by means of an upper disk or cap 64 connected therewith by means of screws 65. This diaphragm is yieldably held in its lowered or inner position by means of a spring 66 arranged in a tubular neck or sleeve 67 rising from the fastening disk 64 and bearing with its lower end against the upper side of the diaphragm 63, while its upper end bears against an adjusting disk 68 which is connected by means of a screw joint 69 with the sleeve 67 so that upon turning this disk in one direction or the other the tension of this spring 66 may be increased or decreased. The strength of this spring 66 is greater than that of the spring 60 which holds the flushing valve closure 57 in its shut position so that when the pressure of the spring 66 is brought in opposition to that of the spring 60, as will presently appear, the last-mentioned spring will yield and permit the closure 57 to be opened.

Upward or outward movement of the diaphragm or movable wall 63 of the controlling chamber is effected by means of the pressure of the water on the outlet side of the pump, for which purpose a branch pressure pipe 70 is employed which communicates at one end with the pressure chamber 61, while its opposite end communicates with a part of the outlet pipe 47 of the pump, as shown in Fig. 1.

Means are provided whereby the downward or inward movement of the movable wall or diaphragm 63 will cause the closure 57 of the flushing valve to be opened temporarily for flushing the filter, which means in their preferred form are best shown in Figs. 8, 10 and 11, and constructed as follows:

The numeral 71 represents the upper cup-shaped head of an abutment which is open at its upper end and has its lower end provided with a shifting rod 72 which bears against the upper or front side of the carrier which supports the closure 57, while its intermediate part is guided in a stuffing box 73 on the upper part of the valve body 54.

The numeral 74 represents the lower supporting head of a thrust member which is arranged axially in line with the abutment head 71 and is connected with the movable wall or diaphragm 63 by means of a shifting rod 75 which is guided in a stuffing box 76 arranged on the under side of the rigid wall 62 of the control chamber. The upper part of the valve body 54 and the bottom 62 of the control chamber are rigidly connected with each other by means of a bracket 77 which preferably has the form of an open yoke, as best shown in Fig. 6. Movable transversely and horizontally in opposite ends of a guideway 78 in the thrust head 74 are two coupling catches, clutch dogs or pawls 79 which are yieldingly held in a position in which they project beyond the thrust head 74 by means of a spring 80 interposed between the inner parts of these dogs or catches. When the abutment head and thrust head are in their fully separated position the clutch dogs or coupling pawls are projected and have their flat longitudinal under sides overhanging the upper edge portions of the cup-shaped abutment head on diametrically opposite sides of the latter, and the outer faces of these dogs or catches which preferably converge downwardly are arranged opposite the parallel vertical faces 81 on opposite sides of the bore of an adjusting sleeve 82 which is connected by means of a screw joint 83 with the upper part of the bracket or yoke 77. While the parts are in this position a downward movement of the thrust head will be transmitted to the abutment head due to engagement of the straight lower horizontal faces of the coupling dogs with the upper edges of the abutment head.

During the last part of the downward movement of the abutment head and thrust head the outer ends of the coupling dogs engage with cam faces 84 on the lower inner part of the adjusting sleeve 82, whereby these dogs are pushed inwardly toward each other on the thrust head to such an extent that their straight undersides are disengaged from the upper edge of the abutment head and thus permits the latter to telescope upwardly over the thrust head and its coupling dogs for a purpose which will be described hereinafter.

The thrust head 74 is held in its elevated position during the time that a water pressure is maintained in the control chamber 61 of sufficient force to move the diaphragm or wall 63 into its uppermost or outermost position, but when the pressure in this chamber is lowered, then the diaphragm 63, together with the thrust head 74, are moved downwardly by the pressure of the spring 66.

The necessary pressure for holding the diaphragm 63 and the thrust head in their uppermost position is effected while the pump is in operation and delivering water from its outlet side to the pressure tank 46, but when the pump ceases to operate the pressure in the control chamber 61 is reduced and the spring 66 operates to depress the diaphragm and the parts associated therewith.

In order to permit the water pressure in the control chamber to drop quickly and thus permit the spring 66 to effect a quick opening of the closure 57 of the flush valve, bleeding means are provided which aid in exhausting the water from the control chamber 61 preparatory to opening the flushing valve for producing a flushing action upon the filter. These bleeding means preferably comprise a bleeder pipe 85 which is connected at one end with the control chamber 61, while its opposite end is connected with the flushing conduit 53 at a point between the flushing valve body 54 and the filter body on the inlet side of the pump. The flow of water through this bleeder pipe may be regulated by means of a valve 86 which is preferably of the needle type and movable toward and from a port 87 in the body 88 of this valve by means of a hand-operated valve stem 89 having a screw joint 90 with the valve body 88 and a thumb piece or handle 91 for manipulating the same.

For the purpose of preventing the back-flow of water through the pipe 53 from backing up through the pipe 85 to the control chamber 61 and interfering with the inward or downward movement of the diaphragm 63, means are provided whereby the back-flow of water through the pipe 53 will produce an exhausting effect upon the water in this controlling chamber and thus permit the spring 66 to operate promptly and efficiently for opening the closure 57 of the flushing valve. The preferred means for this purpose consist of a venturi or ejector which may be variously constructed but preferably has the form shown in Figs. 8 and 9 and constructed as follows:

The numeral 92 represents a Venturi ring which is clamped at its periphery between the opposing ends of two sections of the conduit 53 and provided centrally with an opening 93 through which the water flows from one section to the other of the conduit 53. On its periphery the venturi or ejector ring is provided with an annular groove 94 which communicates with a nipple 95 forming part of the bleeder tube 85. The rear side 96 of the ejector ring is bevelled, as shown in Fig. 8, and from this bevelled face a plurality of ejector openings 97 extend to the annular groove 94 in the periphery of the ring 92, as shown in Figs. 8 and 9.

As the water flows backwardly through the conduit 53, as indicated by the arrow 53l in Fig. 8, and through the opening 93 in the ejector ring, a suction effect is produced through the openings 97 and groove 94, whereby the water in the controlling chamber 61 is forcibly withdrawn through the bleeder pipe 85 and carried backwardly with the water leading to the filter for flushing the latter, thereby permitting the flushing valve to be opened quickly for this purpose instead of being retarded as would be liable to occur if the water passing backwardly through the conduit 53 were permitted to produce a back pressure through the bleeder pipe, and into the controlling chamber.

While the pump is in operation its outlet is placed in communication with the pressure tank 46 and other parts communicating therewith, but when the pump ceases to operate then the same is cut off from the pressure tank and associated parts so that the backflow of water from the pressure tank through the flushing conduit 53 will not pass backwardly through the pump and possibly operate the same. Although various means may be employed for this purpose, those shown in Figs. 1 and 7 are preferred and constructed as follows:

The numeral 98 represents the body of a check valve having two branches 99, 100 which are connected respectively with the two sections 47, 47l of the pump delivery pipe, and a third nozzle 101 which connects with the adjacent section of the flushing conduit 53. The body 98 of this check valve is arranged between the pump and the pressure tank 46 and between the pump and the body 54 of the flushing valve. The pipe 52 of the motor control mechanism is preferably connected with the pipe section 47l between the check valve body 98 and the pressure tank 46, as shown in Fig. 1, so that the motor control mechanism is responsive to the pressure of the water in the tank 46.

Within the body of the check valve 98 is a closure disk 102 which is movable toward and from a seat 103 arranged around the outlet end of a port 104 between the nozzle 100 and the interior of the valve body 98. This closure disk is preferably guided between ways 105 on the inner side of the valve body so that the same can move vertically toward and from the valve seat 103, and its movement away from this valve seat is adjustably controlled by stop 106 which is screwed into a cap 107 on the upper side of the valve body 98 and adapted to be engaged by the upper side of the closure disk 102 for limiting its upward movement.

When the pump is in operation the closure 102 of the check valve is raised from the position shown by full lines, to the position shown by dotted lines in Fig. 7, whereby the outlet of the pump is placed in communication with the pressure tank 46 and the latter receives water from the pump. If, however, the pump ceases to work, then the closure disk 102 drops by gravity into engagement with the seat 103, thereby closing the port 104 and thus preventing any back-flow of water from the pressure tank through the pipes or conduits 47¹, 53 from flowing backwardly through the pump. The operation as a whole of this water supply system is as follows:

When the pressure of the water in the tank 46 is below normal the motor is in operation and driving the pump so that water is drawn from the source of supply through the filter bed and discharged into the pressure tank, the diaphragm 63 is raised, as shown in Fig. 11, by the pressure of water from the pump conducted into the control chamber 61 by the pipe 70, and the closure disk 102 of the check valve body 98 is raised, but the water pressure on the outlet side of the pump cannot pass backwardly through the pipe 53 at this time because the closure 57 of the flushing valve is raised and covers the flushing port 56, as shown in Fig. 11.

When the desired pressure has been reached within the pressure tank, for example 40 lb., then the pressure-operated electric switch 50 opens the electric circuit which supplies the motor 49 whereby the latter is stopped, together with the pump connected therewith, and thus arrests the further transfer of water from the source to the storage tank 46.

The instant the pump ceases to operate and discharge water under pressure from its outlet side, then the closure disk 102 of the return check valve drops so as to close the port 104. When the pump ceases to operate, the pressure of the water in the controlling chamber 61 is immediately reduced below the power of the spring 66 so that the resilience of the latter now forces the diaphragm 63 downwardly. During the greater part of the downward movement of this diaphragm the closure 57 of the flushing valve is moved downwardly away from its seat 58 so as to uncover the flushing port 56, motion from the diaphragm to the flushing valve being transmitted at this time by engagement of the under side of the clutch dogs 79 on the thrust head 74 with the upper edge of the abutment head 71, as shown in Fig. 8.

During the latter part of the downward movement of the diaphragm the outer ends of the clutch or coupling dogs 79 engage with the throw-out or trip cam 84 and are pushed inwardly thereby so as to disengage these dogs or pawls from the upper edge of the abutment head 71, and when this occurs the abutment head and thrust head are uncoupled and the abutment head is moved upwardly so as to telescope over the thrust head, while the latter is still in its lowered position, as shown in Fig. 10. This upward movement of the abutment head independently of the thrust head is effected by the expansion of the closure spring 60 of the flushing valve, which latter operates to close the flushing valve at the same time the abutment head is released from the thrust head and moved upwardly independently thereof.

By this means the port 56 of the flushing valve is temporarily opened a comparatively short time, which however is of sufficient length to permit a quantity of water to be forced from the pressure tank by the weight of the water and the compressed air therein backwardly through the flushing pipe 53 and upwardly through the granular filtering material in the filter and into the surrounding body of water or elsewhere for the purpose of cleansing the filtering bed in the manner heretofore described.

During such back-wash or return flow of water through the flushing pipe 53 the stream of water flowing backwardly through the ejector ring 92 produces a suction from the control chamber 61 through the bleeder pipe 85 to the flushing conduit 53, and thus retains the diaphragm 63 in a lowered position in order to permit a strong backward flow of water through the flushing pipe 53 to be effected and properly agitate the granular filtering material in the filter for thoroughly cleaning the same.

The diaphragm 63 then remains in its lowered position and the closure 57 of the flushing valve remains in its elevated or closed position, as shown in Fig. 10, until the pressure in the storage or pressure tank drops below the normal pressure, say 15 lb., and when this occurs the pressure-operated switch 50 again closes the circuit of the electric motor 49 so that the pump is again actuated for resuming the operation of pumping water from the source to the tank. When such pumping operation is restored the tank is again supplied with water until the maximum pressure has been restored, and during this time a part of the water pressure from the outlet side of the pump is transmitted by the pipe 70 to the control chamber 61, whereby the diaphragm is raised from the position shown in Fig. 10 to the position shown in Fig. 11, and the thrust head 74 is also raised independently of the abutment head until the clutch dogs or coupling pawls 79 are above the upper end of the abutment head and are projected by the spring 80, so that these dogs or pawls overhang the upper end of the abutment head, as shown in Fig. 11, preparatory to coupling the thrust head and abutment head during the next following downward movement of the diaphragm 63, which occurs when the operation of the pump is cut out due to the predetermined pressure having been reached in the pressure tank, as previously described.

By raising or lowering the cam 84 which can be done by screwing the sleeve 82 upwardly or downwardly on the bracket 77, it is possible to change the timing and duration of the opening of the flush valve closure 57 to suit the conditions or requirements of a particular water filtering installation.

As a whole this wash-out or flushing system for filters is comparatively simple in construction considering the function which it performs, its action is positive and reliable, and the same contains no delicate parts which are liable to get out of order, thereby rendering the same particularly well-suited for water filtering installations for use in connection with homes located along the side of lakes, streams or other bodies of water which are distant from cities or villages where municipal water supplies are available.

I claim as my invention:—

1. In a water filtering apparatus, a normal water conduit including a pump having an inlet and an outlet, water filter communicating with said inlet, and a storage tank communicating with said outlet, a flushing conduit independent of the normal water conduit and communicating as a by-pass at its opposite ends with said tank and said filter so as to by-pass said pump, a controlling valve arranged in said flushing conduit means for operating the pump intermittently, and means responsive to changes in pressure on the outlet side of said pump and operating to temporarily open said valve when the pump ceases to operate and permit water to flow backward through said flushing conduit to said filter.

2. A flushing device for a water filtering apparatus having a normal water conduit including an intermittently operating water pump provided with an inlet and an outlet, a water filter connected with said inlet, and a pressure storage tank connected with said outlet; said flushing device including a flushing conduit independent of the normal water conduit and communicating at its opposite ends with said tank and filter, a controlling valve arranged in said flushing conduit, and actuating means which are responsive to changes in the pressure of the water on the outlet side of said pump and which operate to temporarily open said valve and permit water to flow backwardly through said flushing conduit to said filter when said pump ceases to operate.

3. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter, a flushing valve arranged in said conduit and having a port and a closure which is movable for covering and uncovering said port, a control chamber communicating with the outlet side of said pump and having a movable wall adapted to be moved backwardly by the water pressure on the outlet of said pump, pressure means for moving said wall forwardly, a trip device which is releasably connected with said closure and which is actuated by said wall during its forward movement and operates to temporarily move said closure into its open position for permitting water under pressure to pass from said tank to said filter for cleaning the latter and means for closing the closure after being temporarily opened.

4. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter, a flushing valve arranged in said conduit and having a port and a closure which is movable for covering and uncovering said port, a control chamber communicating with the outlet side of said pump and having a movable wall adapted to be moved backwardly by the water pressure on the outlet side of said pump, pressure means for moving said wall forwardly, and a trip device which is releasably connected with said closure and which is actuated by said wall during its forward movement and operates to temporarily move said closure into its open position for permitting water under pressure to pass from said tank to said filter for cleaning the latter including an abutment operatively associated with said closure, a thrust member operatively associated with said movable wall, a coupling device operating to connect said abutment and thrust member during the first part of the forward movement of said wall and to disconnect the same during the last part of their forward movement and also disconnect the same during their entire rearward movement and means for closing said closure after being temporarily opened.

5. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter, a flushing valve arranged in said conduit and having a port and a closure which is movable for covering and uncovering said port, a control chamber communicating with the outlet side of said pump and having a movable wall adapted to be moved backwardly by the water pressure on the outlet of said pump, pressure means for moving said wall forwardly; and a trip device which is actuated by said wall during its forward movement and operates to temporarily move said closure into its open position for permitting water under pressure to pass from said tank to said filter for cleaning the latter, including an abutment operatively associated with said closure, a thrust member operatively associated with said movable wall, a dog mounted on said thrust member and yieldingly engaging said abutment during the first part of the forward movement of the same, a cam adapted to disengage said dog from said abutment during the last part of the forward movement of the thrust member and abutment and means for closing said closure after being temporarily opened.

6. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter; a flushing valve arranged in said conduit and having a port and a closure which is movable for covering and uncovering said port, a control chamber communicating with the outlet side of said pump and having a movable wall adapted to be moved backwardly by the water pressure on the outlet of said pump, pressure means for moving said wall forwardly; and a trip device which is actuated by said wall during its forward movement and operates to temporarily move said closure into its open position for permitting water under pressure to pass from said tank to said filter for cleaning the latter, including an abutment operatively associated with said closure, a thrust member operatively associated with said movable wall, a dog mounted on said thrust member and yieldingly engaging said abutment during the first part of their forward movement, a cam adapted to disengage said dog from said abutment during the last part of the forward movement of the thrust member and abutment, and spring means for yieldingly holding said closure in its closed position.

7. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter; a flushing valve arranged in said conduit and having a port, a closure for covering and uncovering said port, means for yieldingly holding said closure in its closed position; a control chamber communicating with the outlet side of said pump and having one of its walls constructed in the form of a flexible diaphragm, an abutment device operatively related to said closure and having a cup-shaped head, a thrust device associated with said diaphragm and having a thrust head movable into and out of said cup-shaped head, dogs movable transversely on said thrust head, spring means for projecting said dogs into a position to be engaged by the end of said cup-shaped head, and a normally fixed cam adapted to be engaged by said dogs for disengaging the same from said cup-shaped head during the last part of the opening movement of said closure.

8. In a flushing device for use in connection with a water pump having an inlet and an outlet, a filter adapted to receive water from a source of supply and deliver the same to said inlet, and a pressure tank adapted to receive the water from said outlet; a flushing conduit communicating with said tank and filter, a flushing valve arranged in said conduit and having a port, a closure for covering and uncovering said port, means for yieldingly holding said closure in its closed position; a control chamber communicating with the outlet side of said pump and having one of its walls constructed in the form of a flexible diaphragm, an abutment device operatively related to said closure and having a cup-shaped head, a thrust device associated with said diaphragm and having a thrust head movable into and out of said cup-shaped head, dogs movable transversely on said thrust head during the last part of the opening movement of said closure, spring means for projecting said dogs into a position to be engaged by the end of said cup-shaped head, a normally fixed cam adapted to be engaged by said dogs for disengaging the same from said cup-shaped head, and a stationary support on which said cam is adjustably mounted.

9. In a flushing device for use in a water filtering system having a water pump provided with a water inlet and a water outlet, a filter adapted to receive water from a source of supply and discharge the same to the inlet of said pump, and a pressure tank adapted to receive the water from the outlet of said pump; a flushing conduit communicating with said tank and filter, a flushing valve arranged in said conduit and communicating with the outlet of said pump, a control device communicating with the outlet side of said pump and responsive to the pressure of said pump and adapted to temporarily open said flushing valve including means for temporarily opening the flushing valve when the pump stops, and a check valve arranged in said conduit between the outlet of said pump and said flushing valve and the tank and adapted at times to be opened by the pressure of the pump and connect the outlet of the pump with said tank and at other times to be closed automatically and cut off communication between said pump and tank.

10. In a flushing device for use in a water filtering system, having a water pump provided with a water inlet and a water outlet, a filter adapted to receive water from a source of supply and discharge the same to the inlet of said pump, and a pressure tank adapted to receive the water from the outlet of said pump; a flushing conduit communicating with said tank and filter, a flushing valve arranged in said conduit and communicating with the outlet of said pump, a control device communicating with the outlet side of said pump and responsive to the pressure thereof and adapted to temporarily open said flushing valve including means for temporarily opening the flushing valve when the pump stops; and a check valve arranged in said conduit between the outlet of the pump on one side and the flushing valve and the pressure tank on the other side, said check valve being organized to permit water to flow from the pump to said tank when the pump is in operation but to prevent back flow of water from the tank to said pump when the latter ceases to operate and cause said back flow of water to pass through said conduit to the filter.

11. In a flushing device for use in a water filtering system having a water pump provided with a water inlet and a water outlet, a filter adapted to receive water from a source of supply and discharge the same to the inlet of said pump, and a pressure tank adapted to receive the water from the outlet of said pump; a flushing conduit communicating with said tank and filter, a flushing valve arranged in said conduit and communicating with the outlet of said pump, a control device communicating with the outlet side of said pump and responsive to the pressure thereof and adapted to temporarily open said flushing valve including means for temporarily opening the flushing valve when the pump stops, a check valve arranged in said conduit between said tank and flushing valve on one side and the outlet of the pump on the other side, and an ejecting device connecting said control device with the flushing conduit on the discharge side of said flushing valve.

12. In a flushing device for use in connection with a water pump having an inlet and an outlet, a filter adapted to receive water from a source of supply and deliver the same to said inlet and a pressure tank adapted to receive the water from said outlet; a flushing conduit communicating with said tank and filter, a flushing valve arranged in said conduit and having a port and a closure which is movable for covering and uncovering said port, a control chamber communicating with the outlet side of said pump and having a movable wall adapted to be moved backwardly by the water pressure on the outlet of said pump, pressure means for moving said wall forwardly, a trip device which is releasably connected with said closure and which is actuated by said wall during its forward movement and operates to temporarily move said closure into its open position for permitting water under pressure to pass from the outlet side of said pump to said filter for cleaning the latter, including means for temporarily opening the flushing valve when the pump stops, a water bleeding device including an ejector arranged in said conduit between said flushing valve and the filter, and a bleeder tube connecting said control chamber with said ejector.

13. In a flushing device for use in connection with a water pump having an inlet and an outlet, a filter adapted to receive water from a source of supply and deliver the same to said inlet; and a pressure tank adapted to receive the water from said outlet; a flushing conduit communicating with said tank and filter, a flushing valve arranged in said conduit and having a port and a closure which is movable for covering and uncovering said port, a control chamber communicating with the outlet side of said pump and having a movable wall adapted to be moved backwardly by the water pressure on the outlet of said pump, pressure means for moving said wall forwardly, a trip device which is releasably connected with said closure and which is actuated by said wall during its forward movement and operates to temporarily move said closure into its open position for permitting water under pressure to pass from the outlet side of said pump to said filter for cleaning the latter including means for temporarily opening the flushing valve when the pump stops, a water bleeder device including an ejector arranged in said conduit between said flushing valve and the filter, a bleeder tube connecting said control chamber with said ejector, and a regulating valve arranged in said bleeder tube.

14. In a water filtering apparatus, a normal water conduit including a pump having an inlet and an outlet, a water filter communicating with said inlet, and a storage tank communicating with said outlet; a flushing conduit independent of the normal water conduit and communicating at its opposite ends with said tank and filter so as to by-pass said pump, a flushing valve arranged in said flushing conduit, a motor for operating said pump, and automatic mechanism for controlling said motor and actuating said flushing valve in response to variations of pressure in said tank and the passages connecting therewith including means whereby a pressure rise in the tank stops the motor and temporarily opens the flushing valve, or a pressure drop in the tank starts the motor and closes the flushing valve after a predetermined period of its opening.

15. In a water filtering apparatus, a normal water conduit including a pump having an inlet and an outlet, a water filter communicating with said inlet, and a storage tank communicating with said outlet; a flushing conduit independent of the normal water conduit and communicating at its opposite ends with said tank and filter so as to by-pass said pump, a flushing valve arranged in said flushing conduit, a motor for operating said pump, a check valve arranged between the outlet of the pump and both said tank and flushing conduit and adapted in one position to cut off the outlet of the pump from the tank and flushing conduit and establish communication between the tank and the flushing conduit and in another position to place the outlet of the pump in communication with said tank and flushing conduit, and automatic mechanism for controlling said motor and actuating said flushing valve in response to variations in pressure in the tank and the passages communicating therewith including means whereby a pressure rise in said tank stops the motor and opens said flushing valve and a pressure drop between the outlet side of said pump and the check valve starts the motor and closes the flushing valve after a predetermined period of its opening.

16. In a flushing device for a water filtering system having a pump provided with an inlet and an outlet, a filter receiving water from a source of supply and discharging the same to said inlet, a pressure tank receiving the water from said outlet, a flushing conduit communicating with said tank and filter, a flushing valve arranged in said flushing conduit and having a closure, a check valve adapted to either connect the outlet of the pump with both said tank and flushing conduit or to cut off the outlet of the pump from both the tank and flushing conduit and leave the tank and flushing conduit in communication; a control chamber communicating with said outlet between the pump and the check valve and having a movable wall; means which operatively connect said wall with the closure of said flushing valve, a conduit connecting the outlet of said pump and said control chamber, and means whereby a pressure drop in the pump outlet and control chamber operate to close said flushing valve.

17. In a flushing device for a water filtering system having a pump provided with an inlet and an outlet, a filter receiving water from a source of supply and discharging the same to said inlet, a pressure tank receiving the water from said outlet, a flushing conduit communicating with said tank and filter, a flushing valve arranged in said flushing conduit and having a closure, a check valve adapted to either connect the outlet of the pump with both said tank and flushing conduit or to cut off the outlet of the pump from both the tank and flushing conduit and leave the tank and flushing conduit in communication; a control chamber communicating with said outlet between the pump and the check valve and also communicating with said flushing conduit between the flushing valve and the filter and having a movable wall; and means associated with said wall and closure whereby a pressure drop in the control chamber operates to shut the closure of said flushing valve.

WILLIS H. JONES.